(12) United States Patent
Walter et al.

(10) Patent No.: US 7,870,263 B2
(45) Date of Patent: Jan. 11, 2011

(54) CARRIER INTEROPERABILITY FOR CRITICAL SERVICES

(75) Inventors: Edward Walter, Boerne, TX (US); Michael Raftelis, San Antonio, TX (US)

(73) Assignee: AT&T Intellectual Property I, L.P., Reno, NV (US)

( * ) Notice: Subject to any disclaimer, the term of this patent is extended or adjusted under 35 U.S.C. 154(b) by 709 days.

(21) Appl. No.: 11/317,020

(22) Filed: Dec. 27, 2005

(65) Prior Publication Data

US 2007/0150615 A1    Jun. 28, 2007

(51) Int. Cl.
G06F 15/16        (2006.01)
G06F 15/173       (2006.01)

(52) U.S. Cl. .................. 709/227; 709/228; 709/238; 709/239

(58) Field of Classification Search ............ 709/227, 709/228, 238, 239
See application file for complete search history.

(56) References Cited

U.S. PATENT DOCUMENTS

| | | | | |
|---|---|---|---|---|
| 5,848,055 A * | 12/1998 | Fedyk et al. | ................. | 370/228 |
| 5,933,425 A * | 8/1999 | Iwata | .................... | 370/351 |
| 5,966,658 A * | 10/1999 | Kennedy et al. | ......... | 455/426.1 |
| 6,222,820 B1 * | 4/2001 | Hamami | ................... | 370/218 |
| 6,266,701 B1 * | 7/2001 | Sridhar et al. | ............... | 709/232 |
| 6,373,399 B1 * | 4/2002 | Johnson et al. | ......... | 340/870.11 |
| 6,404,769 B1 * | 6/2002 | Kapoor | ...................... | 370/398 |
| 6,530,004 B1 * | 3/2003 | King et al. | .................. | 711/165 |
| 6,859,929 B1 * | 2/2005 | Smorodinsky | .............. | 719/310 |
| 6,886,032 B2 * | 4/2005 | Watkins et al. | .............. | 709/216 |
| 6,914,912 B1 * | 7/2005 | Skalecki et al. | ............. | 370/468 |
| 6,937,611 B1 * | 8/2005 | Ward | .......................... | 370/462 |
| 6,947,377 B1 * | 9/2005 | Shimano et al. | ............. | 370/228 |
| 7,024,487 B2 * | 4/2006 | Mochizuki et al. | .......... | 709/238 |
| 7,036,149 B2 * | 4/2006 | Sonoda et al. | ................ | 726/27 |
| 7,050,718 B2 * | 5/2006 | Rychlicki | ..................... | 398/57 |
| 7,058,958 B1 * | 6/2006 | Shutt et al. | ................... | 719/328 |
| 7,124,187 B1 * | 10/2006 | Kodialam et al. | ........... | 709/226 |
| 7,215,640 B2 * | 5/2007 | Matsubara | ................... | 370/235 |
| 7,219,120 B2 * | 5/2007 | Hui | ............................. | 709/225 |
| 7,231,486 B2 * | 6/2007 | Ajanovic et al. | ............ | 710/315 |
| 7,330,997 B1 * | 2/2008 | Odom | ........................... | 714/6 |
| 7,334,156 B2 * | 2/2008 | Land et al. | ..................... | 714/7 |
| 7,349,903 B2 * | 3/2008 | Clark et al. | ........................ | 1/1 |
| 7,359,360 B2 * | 4/2008 | Ronneke | ..................... | 370/338 |
| 7,394,776 B2 * | 7/2008 | Lee et al. | ..................... | 370/310 |
| 7,406,048 B2 * | 7/2008 | Datta et al. | ................. | 370/238 |
| 7,463,581 B1 * | 12/2008 | Ellis et al. | .................... | 370/228 |
| 7,558,276 B2 * | 7/2009 | Vasseur et al. | ............. | 370/401 |

* cited by examiner

*Primary Examiner*—Kristie D Shingles
(74) *Attorney, Agent, or Firm*—Greenblum & Bernstein P.L.C.

(57) ABSTRACT

A system processes communication path requests in an autonomous system. The system includes a proxy server that receives a request message from an external system requesting establishment of a communication path through the autonomous system. The request message includes a desired communication path profile including a desired level of redundancy. The system also includes a management server in the autonomous system that receives the request message from the proxy server, generates a response message indicating whether a communication path corresponding to the desired communication path profile is available, and sends the response message to the proxy server. The proxy server receives the response message and transmits the response message to the external system.

12 Claims, 6 Drawing Sheets

CARRIER INTEROPERABILITY FOR CRITICAL SERVICES

BACKGROUND

1. Field of the Disclosure

The present disclosure relates to the field of telecommunication services. More particularly, the present disclosure relates to an automated system and method for providing high availability services across multiple autonomous systems.

2. Background Information

An autonomous system is a network or group of networks which is under the control of a single administrative entity. For example, an autonomous system may be a system controlled by a communications carrier. Autonomous systems are typically interconnected by way of interconnect points. Creating a redundant path in a single autonomous system typically involves retrieving the state of the system, selecting an initial path through the system, inputting parameters which dictate the end state operation of the redundant path, determining redundant paths for comparison, evaluating the potential paths, and choosing the appropriate path.

Critical services and applications, such as Voice-Over-IP (VoIP) and video services, require a communication path with high availability, and sometimes require that a communication path be formed across multiple autonomous systems. Creating a redundant path across multiple autonomous systems is difficult because the information necessary to select a redundant path through one autonomous system is typically not accessible to another autonomous system and not likely to be easily obtained through normal channels. Further, carriers are reluctant to allow other carriers or customers to have visibility into their networks, as visibility can yield competitive advantages, security vulnerability, and access to internal architectures. Therefore, when a first carrier requires a communication path through a second carrier's network, negotiation is required between the carriers. However, this negotiation is typically a lengthy process, which may take days or even weeks.

BRIEF DESCRIPTION OF THE DRAWINGS

The present disclosure is described in the detailed description that follows, by reference to the noted drawings by way of non-limiting examples of embodiments of the present disclosure, in which like reference numerals represent similar parts throughout several views of the drawings, and in which.

DETAILED DESCRIPTION

Figure 1:
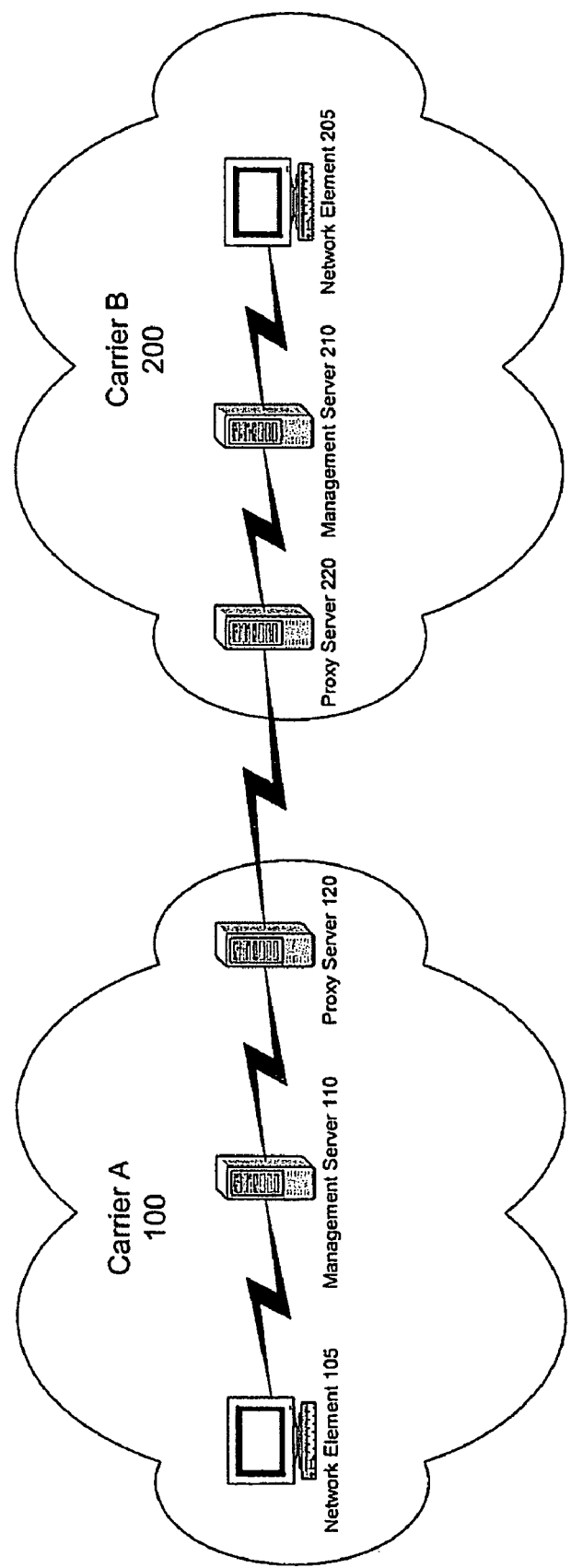
FIG. 1 is a block diagram showing a general topology of a system according to an aspect of the disclosure.

In view of the foregoing, the present disclosure, through one or more of its various aspects, embodiments and/or specific features or sub-components, is thus intended to bring out one or more of the advantages as specifically noted below.

The present disclosure relates to providing high availability services across multiple autonomous systems, including creating a redundant path through at least one of the systems.

An aspect of the present disclosure is directed to a computer-readable medium which stores a program for processing communication path requests. The computer-readable medium includes a request receiving code segment that receives an external request message from an external system requesting establishment of a communication path through an autonomous system. The request message includes a desired communication path profile including a desired level of redundancy. The computer-readable medium also includes a sending code segment that sends the request message to an identified server of the autonomous system, and a response receiving code segment that receives a response message from the identified server. The response message indicates whether the communication path corresponding to the desired communication path profile is available. The computer-readable medium also includes a transmitting code segment that transmits the response message to the external system.

The desired communication path profile may include criteria for at least one of latency, jitter, reliability, number of hops, geographic areas, and duplicate nodes. The request message and the response message may include a transaction identifier, which is the same for the request message and the response message. The response message may include at least one alternative option when the desired communication path is not available.

The computer-readable medium may also includes an order receiving code segment that receives an order message from the external system, and sends the order message to the identified server. The order message instructs establishment of one of a communication path corresponding to the desired communication path profile and the at least one alternative option.

Another aspect is directed towards another computer-readable medium which stores a program for processing communication path requests. The computer-readable medium includes a receiving code segment that receives, from a proxy server, a request message from an external system requesting establishment of a communication path through an autonomous system. The request message includes a desired communication path profile including a desired level of redundancy. The computer-readable medium also includes a generating code segment that generates a response message indicating whether the communication path through the autonomous system corresponding to the desired communication path profile is available, and a sending code segment that sends the response message to the proxy server.

The desired communication path profile may include criteria for at least one of latency, jitter, reliability, hops, geographic areas, and duplicate nodes. The request message and the response message may include a transaction identifier, where the transaction identifier is the same for the request message and the response message. The computer-readable medium may also include a first determining code segment that determines whether the communication path corresponding to the desired communication path profile is available.

The computer-readable medium may also include a second determining code segment that determines at least one alternative option to the communication path profile when the first determining code segment determines that the communication path corresponding to the desired communication path profile is not available. The response message indicates the at least one alternative option, or indicates a request denial when the second determining code segment determines that alternative options are not available.

The program may also include an order receiving code segment that receives an order message from the proxy server. The order message instructs establishment of one of the communication path corresponding to one of the desired communication path profile and the at least one alternative communication path. The program may also include a communication path establishing code segment that establishes a communication path according to the order message.

Another aspect is directed towards a system for processing communication path requests in an autonomous system. The system includes a proxy server that receives a request message from an external system requesting establishment of a communication path through the autonomous system. The request message includes a desired communication path profile including a desired level of redundancy. The system also includes a management server in the autonomous system that receives the request message from the proxy server, generates a response message indicating whether establishment of a communication path corresponding to the desired communication path profile is available, and sends the response message to the proxy server. The proxy server receives the response message and transmits the response message to the external system.

The management server has access to information regarding the second autonomous system's resources. The proxy server may serve a plurality of management servers, and each of the plurality of management servers may serve a network.

The desired communication path profile may include criteria for at least one of latency, jitter, reliability, hops, geographic areas, and duplicate nodes. The request message and the response message may include a transaction identifier, where the transaction identifier is the same for the request message and the response message.

The management server may determine whether the communication path corresponding to the desired communication path profile is available, and determine at least one alternative option to the communication path profile when it determines that the communication path corresponding to the desired communication path profile is not available.

The proxy server may receive an order message from the external system, and send the order message to the management server. The order message instructs establishment of one of the communication path corresponding to one of the desired communication path profile and the at least one alternative communication path. The management server may receive the order message from the proxy server, and establish a communication path according to the order message.

The various aspects and embodiments of the present disclosure are described in detail below.

FIG. 1 shows a general topology of a system for providing carrier interoperability. As shown in FIG. 1, a management server 110 resides within the autonomous system 100 controlled by Carrier A, which facilitates requests for services, for example, from a network element (NE) 105. A management server 210 likewise resides within the autonomous system 200 controlled by Carrier B. Each management server 110, 210 has access to information regarding the resources of its respective autonomous system 100, 200. This information includes, but is not limited to, information regarding available communication paths within the system 100, 200, performance criteria, utilization of communication links, and redundancy options. In alternate embodiments, the management servers 110, 210 maintain this information, or they can query other systems, such as an Operations Support System (OSS) or Element Management System (EMS), to retrieve this information. However, for quick retrieval, it may be advantageous for the management servers 110, 210 to store this information. In an embodiment in which the management servers 110, 210 store the system resource information, the information is updated when changes occur to the respective autonomous systems.

Although FIG. 1 illustrates only a single management server 110, 210 for each autonomous system 100, 200, multiple management servers may be utilized with each autonomous system 100, 200 without affecting the scope and spirit of the present disclosure. For example, an autonomous system may utilize a management server for each sub-network of the autonomous system. Likewise, the functionality of the management servers may be included in the NE 105 and the NE 205, respectively.

As shown in FIG. 1, a proxy server 120 resides within the autonomous system 100 controlled by Carrier A, and a proxy server 220 resides within the autonomous system 200 controlled by Carrier B. The proxy servers 120, 220 filter messages destined to management servers 110, 210 of the autonomous systems 100 and 200, respectively, and send the messages to the appropriate management servers. The proxy servers 120, 220 provide a layer of security to the management servers 110, 210, respectively, as they limit visibility to the system resources managed by the management servers 110, 210. In an embodiment, the proxy servers 120, 220 may reside outside the autonomous systems, for example, in a common communication network separate from the autonomous systems 100, 200.

According to an embodiment, when Carrier A requires a communication path having a certain level of redundancy through Carrier B, a management server of Carrier A (management server 110, for example) sends a request message to the proxy server 120, which sends the request message to the proxy server 220. The proxy server 220 determines which management server of Carrier B should receive the message, and sends the request message to the appropriate management server (for example, management server 210). A response message from management server 210 will follow the reverse path.

Figure 2:
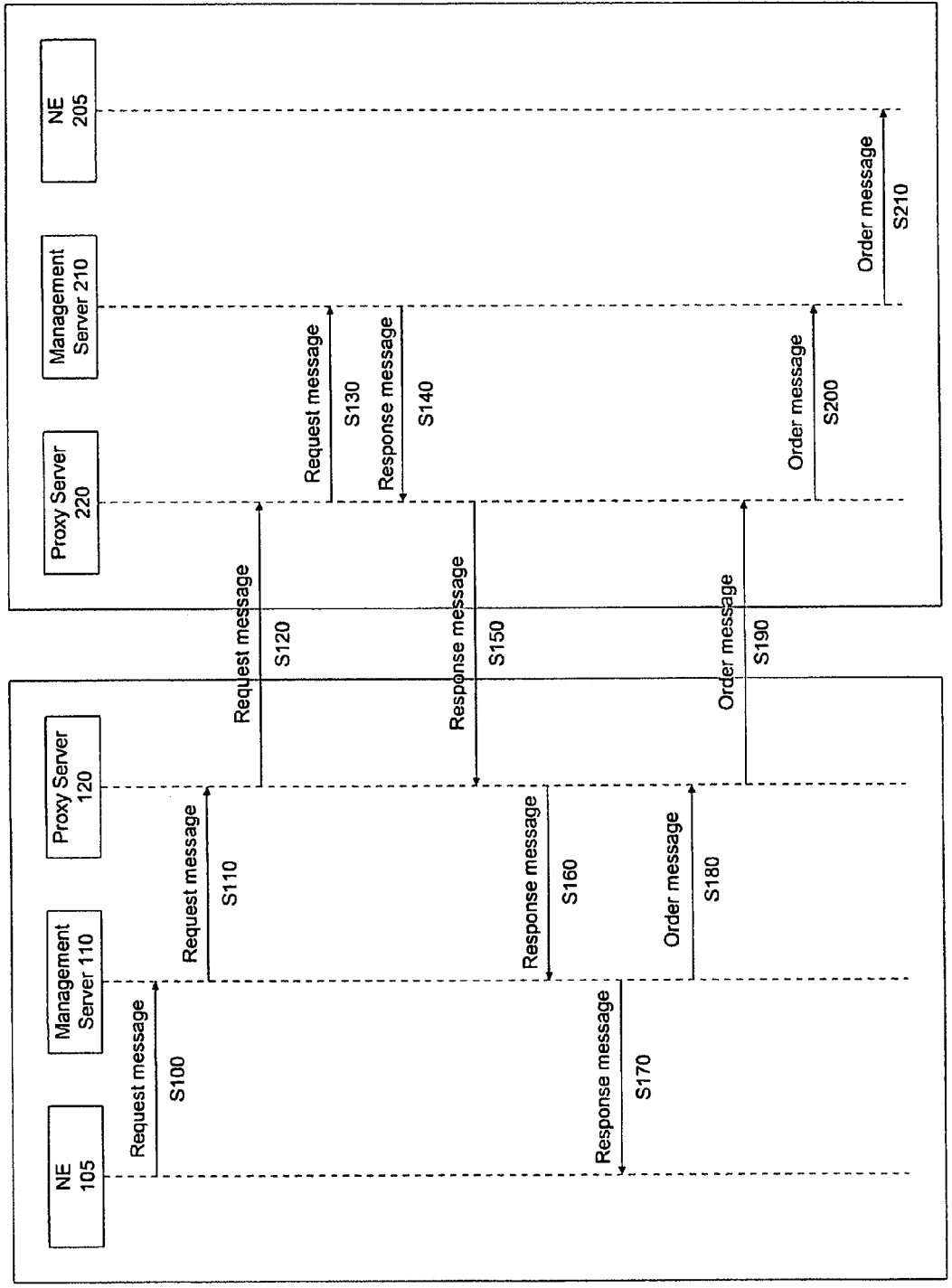
FIG. 2 is a flow diagram illustrating an exemplary automated method for establishing a communication path through autonomous networks according to an aspect of the disclosure.
Figure 3A:
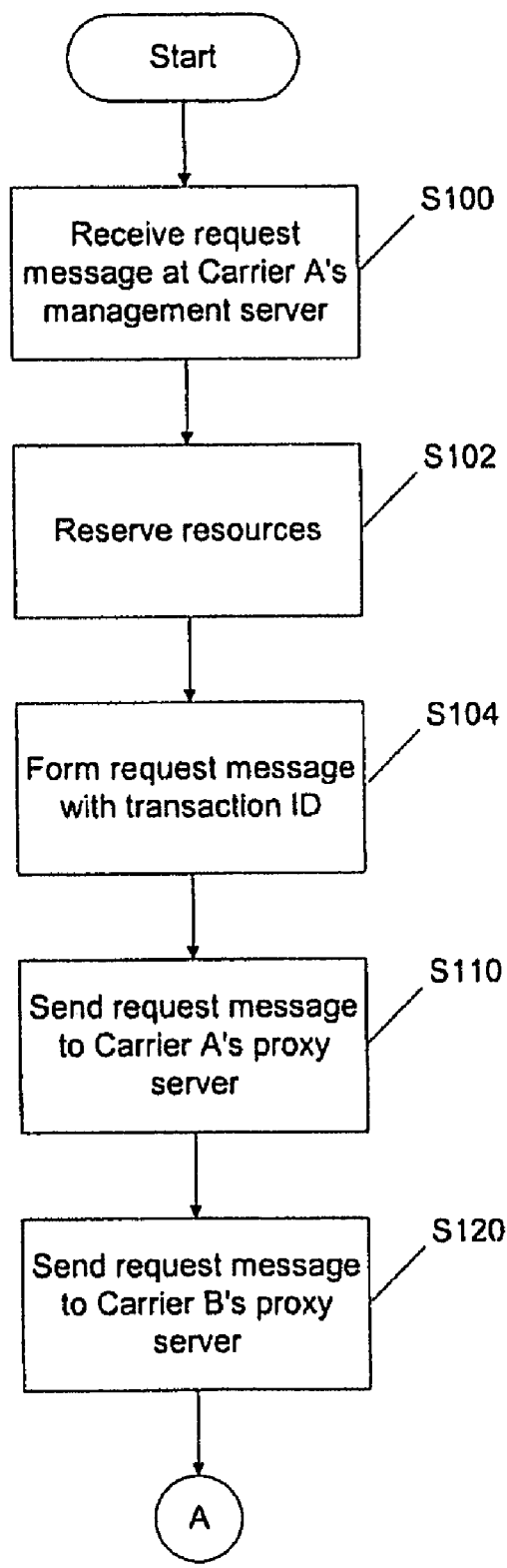
FIGS. 3A-3C is a flow chart illustrating an exemplary automated method for establishing a communication path through autonomous networks according to an aspect of the disclosure.
Figure 3B:
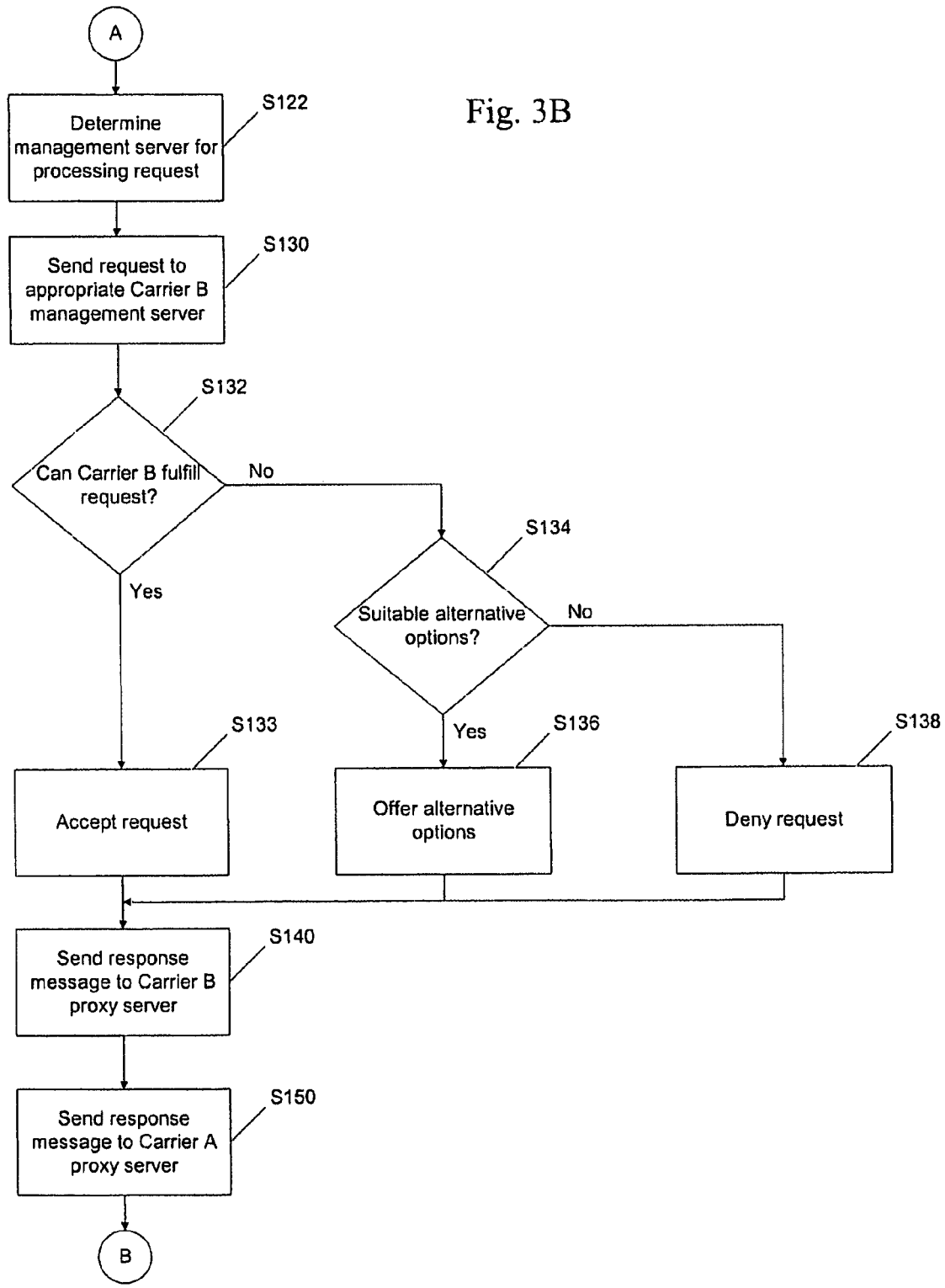
Figure 3C:
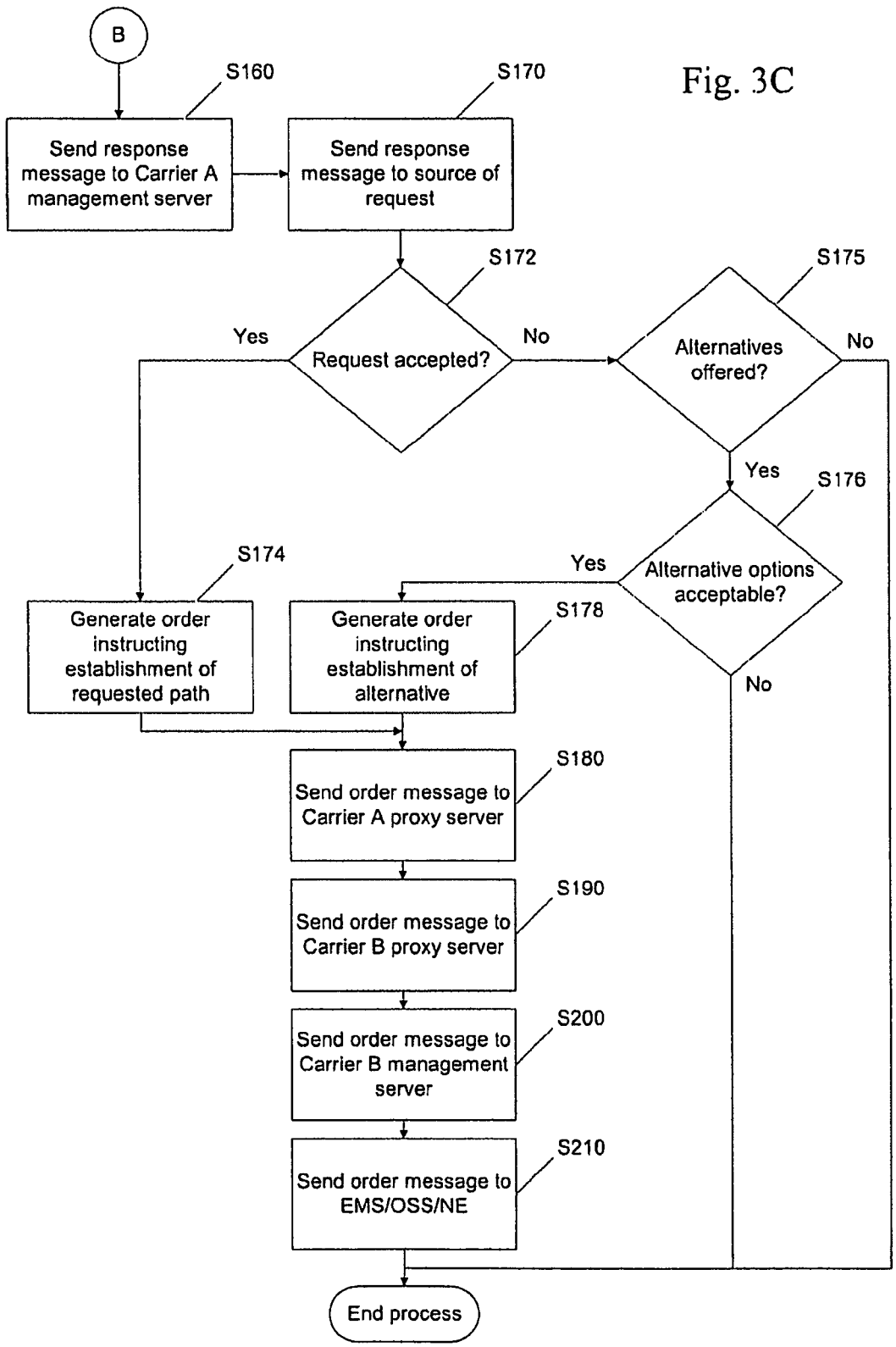

FIG. 2 shows a flow diagram illustrating an exemplary message routing for establishing a communication path through the system of Carrier B, in response to a request message from Carrier A according to an aspect of the present disclosure. The messages exchanged are of a common, consistent format, understandable to the parties involved in the exchange. FIGS. 3A-3C show a flow chart illustrating the exemplary automated method, in which the message exchange steps correspond to the communication path messaging of FIG. 2, as indicated by the numbering.

The process begins when the management server 110 receives from NE 105, of Carrier A, which may be an EMS or OSS, for example, a request message requesting establishment of a communication path through Carrier B's network (S100). The request message includes a communication path profile that specifies certain minimum criteria for a requested communication path. The profile may include at least one or more of the following information:

Minimum latency: The minimum latency that the communication path can have. The minimum latency may be expressed, for example, as a numeric value in milliseconds.

Minimum jitter: The minimum jitter allowed through the requested communication path. The minimum jitter may be expressed, for example, as a numeric value in milliseconds.

Redundancy type: The type of redundancy requested. It may be defined, for example, as a set of options, including full redundancy (a complete backup path), shared redundancy (a backup path shared with a threshold of other communication paths), or no redundancy.

Reliability: The reliability of the communication path. The reliability may be expressed, for example, as a number of minutes of downtime, or percentage of availability (similar to a reliability value specified in a Service Level Agreement (SLA)).

Hop limitations: The number of nodes the request communication path may traverse.

Geographic limitations: The profile may specify that the communication path include or exclude certain geographic areas. It may be expressed, for example, as a string.

Number of duplicate nodes: The number of nodes that a main path and a redundant path may share. It may be expressed, for example, as an integer (where zero would indicate that the main path and redundant path must be completely separate).

After the management server 110 receives the request message, Carrier A temporarily reserves resources for setting up a communication link to Carrier B's system (S102). The management server 110, then formulates a request message which includes the communication path profile, and generates a transaction identifier (ID), which is included in the request message (S104). According to one embodiment, the request message may include fields for each of the criteria specified in the profile. The transaction ID uniquely identifies each communication path request, and is included in each message associated with a particular communication path request. The transaction ID allows the senders and receivers of the messages to differentiate requests, as the systems may respond to multiple requests simultaneously.

After formulating the request message, the management server 110 sends the request message to Carrier A's proxy server 120 (S110). The proxy server 120 determines that Carrier B's proxy server 220 is the appropriate proxy server to establish the communication path, and then forwards the request message to Carrier B's proxy server 220 (S120) in autonomous system 200.

Upon receiving the request message, proxy server 220 determines which management server of Carrier B is appropriate to process the request message (S122). This determination is based on, for example, but not limited to, a termination point of the requested communication path. The proxy server 220 then forwards the request message to the appropriate management server (for example, management server 210) (S130).

When management server 210 receives the request message, it determines whether it is possible to set up a communication path through Carrier B's system which satisfies the criteria set forth in the communication path profile of the request message (S132). To make this determination, the management server 210 accesses information regarding the resources of Carrier B's system. As described above, the management server 210 may have this information stored, or it may query an OSS or EMS for this information, including, for example, NE 205.

When management server 210 determines that it is not possible to set up a communication path through Carrier B's system which satisfies the criteria set forth in the communication path profile of Carrier A's request message (S132, No), the management server 210 can determine whether suitable alternative options are available (S134). For example, the management server 210 can offer Carrier A an immediate communication path which comes close to satisfying the criteria of the profile, or the management server 210 can offer to provide a communication path satisfying the criteria of the profile at some later period of time (S136). However, if no suitable alternative options are available (S134, No), the management server 210 can simply deny Carrier A's request without providing any alternative options (S138).

When the management server 210 determines that a communication path meeting the criteria of the profile can be established (S132, Yes), the management server 210 generates a response message which indicates that Carrier A's request can be fulfilled (S133).

The response message, accepting or denying the communication path request, is sent to the proxy server 220 (S140). The response message includes the transaction ID included in the original request message. When the management server 210 is unable to meet Carrier A's requirements but can propose alternative options, the management server 210 includes the alternative options in the response message. However, if the management server 210 determines that no suitable alternative options are available, the response message simply includes a denial indication.

The proxy server 220 forwards the response message to the proxy server 120 (S150) in autonomous system 100. The proxy server 120 then forwards the response message to the management server 110 (S160). The management server 110 then sends the response message to the NE 105 which generated the request (S170).

The management server 110 then determines the contents of the response message. When the response message indicates that Carrier B can establish a communication path meeting the criteria of the profile (S172, Yes), the management server 110 generates an order message instructing establishment of such a communication path (S174).

When the response message indicates that Carrier B is unable to meet the criteria of the profile (S172, No), the management server 110 determines whether alternative options are offered (S175). If so (S175, Yes), the management server 110 determines whether the alternative options are acceptable (S176). If so (S176, Yes), the management server 110 generates an order message instructing establishment of an alternative communication path corresponding to the alternative option (S178). When more than one alternative option is presented, the management server 110 selects the most desirable alternative. However, if the management server 110 determines that none of the alternative options are acceptable (S176, No), or if the request message was denied without presenting alternative options (S175, No), the process ends.

Further, in addition to accepting or rejecting an alternative, the management server 110 may offer a different alternative, or request a hold. A hold is a time based constraint that temporarily reserves the resources of a selected profile until the originator can confirm the terms of the profile with their respective customer.

In an alternate embodiment, the NE 105 may make the determinations, such as, whether the request has been accepted, and whether to select alternative options, and send a corresponding order message to the management server 110.

The management server 110 then sends the order message, which includes the transaction ID of the original request message, to the proxy server 120 (S180). As mentioned above, the order message includes an instruction to establish either a communication path corresponding to the communication path profile, or an alternative communication path corresponding to the selected alternative option.

The proxy server 120 forwards the order message to the proxy server 220 (S190), which forwards the message to the management server 210 (S200). The management server 210 then forwards the order message to the appropriate EMS, OSS or NE, e.g. NE 205 (S210), which establishes the communication path for Carrier A through the autonomous system 200 of Carrier B.

The system described above provides automated, dynamic creation of high availability paths through multiple autonomous systems. This process may take place in less than a second without any human interaction, reducing overhead costs. Further, carriers may keep the architecture and topology of their network private, thus revealing no competitive advantages.

The proxy servers and the management servers described above may be implemented on separate machines, or they may be implemented on the same machine. In an embodiment in which the proxy server and the management server are implemented on the same machine, a firewall may be provided between the proxy server and the management server to provide a layer of security. Further, the proxy servers and/or management servers may be integrated with an EMS, OSS or NE.

Figure 4:
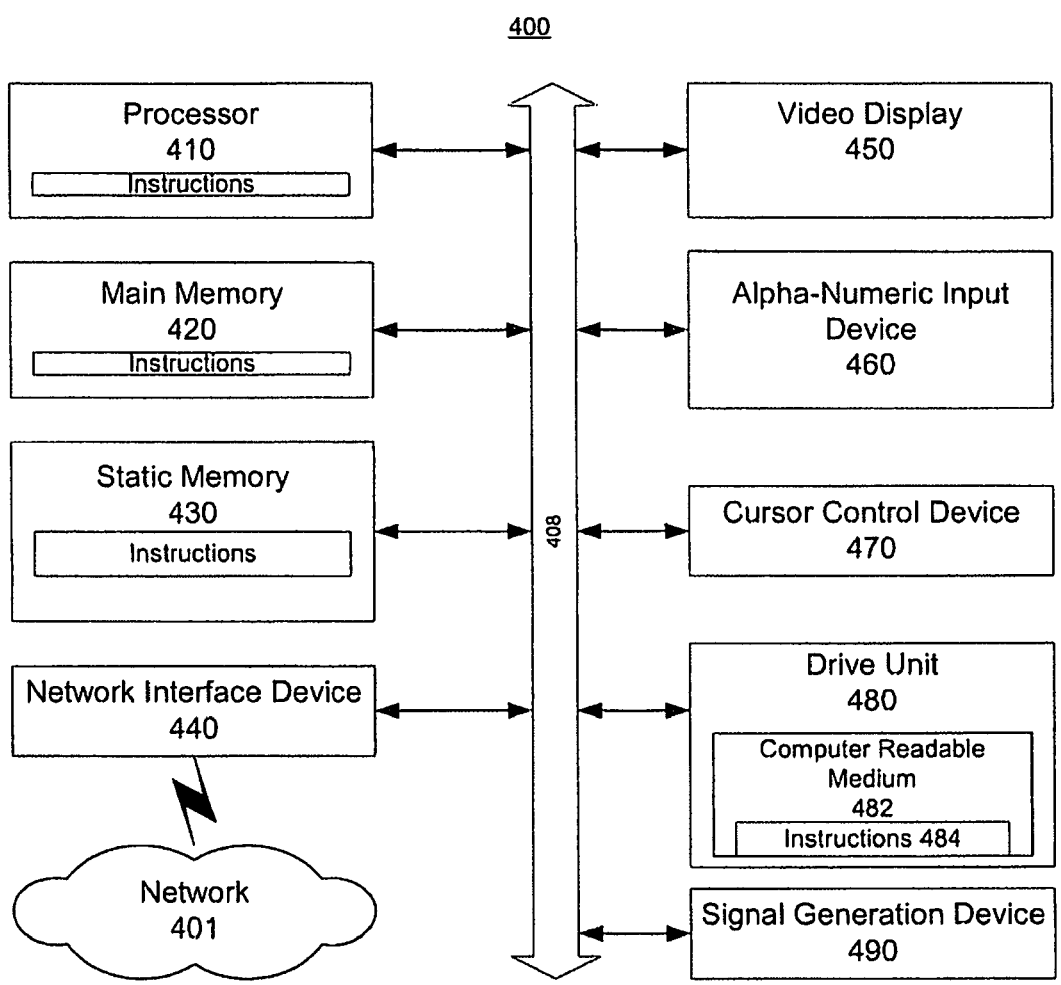
FIG. 4 is a general computer system for implementing an automated method for establishing a communication path through autonomous networks according to an aspect of the disclosure.

Referring to FIG. 4, a description is now provided of an illustrative embodiment of a general computer system 400, on which the automated process for establishing a communication path through autonomous networks can be implemented. The computer system 400 can include a set of instructions that can be executed to cause the computer system 400 to perform any one or more of the methods or computer based functions disclosed herein. The computer system 400 may operate as a standalone device or may be connected, e.g., using a network 401, to other computer systems or peripheral devices.

As illustrated in FIG. 4, the computer system 400 may include a processor 410, e.g., a central processing unit (CPU), a graphics processing unit (GPU), or both. Moreover, the computer system 400 can include a main memory 420 and a static memory 430 that can communicate with each other via a bus 408. As shown, the computer system 400 may further include a video display unit 450, such as a liquid crystal display (LCD), an organic light emitting diode (OLED), a flat panel display, a solid state display, or a cathode ray tube (CRT). Additionally, the computer system 400 may include an input device 460, such as a keyboard, and a cursor control device 470, such as a mouse. The computer system 400 can also include a disk drive unit 480, a signal generation device 490, such as a speaker or remote control, and a network interface device 440.

In a particular embodiment, as depicted in FIG. 4, the disk drive unit 480 may include a computer-readable medium 482 in which one or more sets of instructions 484, e.g., software, can be embedded. Further, the instructions 484 may embody one or more of the methods or logic as described herein. In a particular embodiment, the instructions 484 may reside completely, or at least partially, within the main memory 420, the static memory 430, and/or within the processor 410 during execution by the computer system 400. The main memory 420 and the processor 410 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable storage medium 482 that includes instructions 484 or receives and executes instructions 484, so that a device connected to a network 401 can communicate voice, video or data over the network 401.

While the computer-readable storage medium is shown to be a single medium, the term "computer-readable medium" includes a single medium or multiple media, such as centralized or distributed database, and/or associated caches and servers that store one or more sets of instructions. The term "computer-readable storage medium" shall also include any medium that is capable of storing or encoding a set of instructions for execution by a processor or that cause a computer system to perform any one or more of the methods or operations disclosed therein.

In a particular non-limiting, exemplary embodiment, the computer-readable storage medium can include a solid state memory such as memory card or other package that houses one or more non-volatile read-only memories. Further, the computer-readable storage medium can be a random access memory or other volatile re-writable memory. Additionally, the computer-readable storage medium can include a magneto-optical or optical medium, such as a disk or tapes or other storage device. A digital file attachment to an e-mail or other self-contained information archive or set of archives may be considered a distribution medium that is equivalent to a tangible storage medium. Accordingly, the disclosure is considered to include any one or more of a computer-readable storage medium or a distribution medium and other equivalents and successor media, in which data or instruction s may be stored.

The foregoing embodiments and advantages are merely exemplary and are not to be construed as limiting the present disclosure. The description of the present disclosure is intended to be illustrative, and not to limit the scope of the claims. Many alternatives, modifications, and variations will be apparent to those skilled in the art.

In an embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

One or more embodiments of the disclosure may be referred to herein, individually and/or collectively, by the term "disclosure" merely for convenience and without intending to voluntarily limit the scope of this application to any particular disclosure or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Although the disclosure has been described with reference to several exemplary embodiments, it is understood that the words that have been used are words of description and illustration, rather than words of limitation. As the present disclosure may be embodied in several forms without departing from the spirit or essential characteristics thereof, it should also be understood that the above-described embodiments are not limited by any of the details of the foregoing description, unless otherwise specified. Rather, the above-described embodiments should be construed broadly within the spirit and scope of the present disclosure as defined in the appended claims. Therefore, changes may be made within the metes and bounds of the appended claims, as presently stated and as amended, without departing from the scope and spirit of the disclosure in its aspects.

What is claimed is:

1. A computer-readable storage medium, executable by a computer, storing a program for processing communication path requests, the computer-readable storage medium comprising:

a request receiving code segment that receives an external request message from an external system requesting establishment of a communication path through an autonomous system, the request message comprising a desired communication path profile including a desired level of communication path redundancy;

a sending code segment that sends the request message to an identified server of the autonomous system;

a response receiving code segment that receives a response message from the identified server, the response message indicating whether the communication path corresponding to the desired communication path profile is available, and, when the communication path corresponding to the desired communication path profile is unavailable, the response message further indicating at least one alternative communication path;

a transmitting code segment that transmits the response message to the external system;

an order receiving code segment that receives an order message from the external system and sends the order message to the identified server, the order message instructing one of establishment of the communication path corresponding to the desired communication path profile and one of establishment of the at least one alternative communication; and a communication path establishing code segment that establishes a communication path according to the order message.

2. The computer-readable storage medium according to claim 1, wherein the desired communication path profile includes criteria for at least one of latency, jitter, reliability, number of hops, geographic areas, and duplicate nodes.

3. The computer-readable storage medium according to claim 1, wherein the request message and the response message include a transaction identifier, the transaction identifier being the same for the request message and the response message.

4. A computer-readable storage medium, executable by a computer, storing a program for processing communication path requests, the computer-readable storage medium comprising:

a receiving code segment that receives, from a proxy server, a request message from an external system requesting establishment of a communication path through an autonomous system, the request message comprising a desired communication path profile including a desired level of communication path redundancy;

a first determining code segment that determines whether the communication path corresponding to the desired communication path profile is available;

a second determining code segment that determines at least one alternative communication path when the first determining code segment determines that the communication path corresponding to the desired communication path profile is unavailable;

a generating code segment that generates a response message indicating whether the communication path through the autonomous system corresponding to the desired communication path profile is available, and, when the first determining code segment determines that the communication path corresponding to the desired communication path profile is unavailable, the response message further indicating the at least one alternative communication path determined by the second determining code segment;

a sending code segment that sends the response message to the proxy server;

an order receiving code segment that receives, from the proxy server, an order message from the external system instructing one of establishment of the communication path corresponding to the desired communication path profile and one of establishment and rejection of the at least one alternative communication path; and a communication path establishing code segment that establishes a communication path according to the order message.

5. The computer-readable storage medium according to claim 4, wherein the desired communication path profile includes criteria for at least one of latency, jitter, reliability, hops, geographic areas, and duplicate nodes.

6. The computer-readable storage medium according to claim 4, wherein the request message and the response message include a transaction identifier, the transaction identifier being the same for the request message and the response message.

7. The computer-readable storage medium according to claim 4, in which the response message further indicates a request denial when the second determining code segment determines that the alternative communication path is unavailable.

8. A system for processing communication path requests in an autonomous system comprising:

a proxy server that receives a request message from an external system requesting establishment of a communication path through the autonomous system, the request message comprising a desired communication path profile including a desired level of communication path redundancy; and a management server in the autonomous system that receives the request message from the proxy server, determines whether the communication path corresponding to the desired communication path profile is available, determines at least one alternative communication path when it determines that the communication path corresponding to the desired communication path profile is unavailable, generates a response message indicating whether the communication path corresponding to the desired communication path profile is available and further indicating the at least one alternative communication path when the communication path corresponding to the desired communication path profile is unavailable, and sends the response message to the proxy server, wherein the proxy server receives the response message from the management server and transmit the response message to the external system, wherein the proxy server receives an order message from the external system and sends the order message to the management server, the order message instructing one of establishment of the communication path corresponding to the desired communication path profile and one of establishment and rejection of the at least one alternative communication path, and wherein the management server receives the order message from the proxy server, and establishes a communication path according to the order message.

9. The system according to claim 8, wherein the management server has access to information regarding the autonomous system's resources.

10. The system according to claim 9, wherein the proxy server serves a plurality of management servers, and each of the plurality of management servers serves a network.

11. The system according to claim 8, wherein the desired communication path profile includes criteria for at least one of latency, jitter, reliability, hops, geographic areas, and duplicate nodes.

12. The system according to claim 8, wherein the request message and the response message include a transaction identifier, the transaction identifier being the same for the request message and the response message.

* * * * *